(12) United States Patent
Wang

(10) Patent No.: US 12,149,792 B2
(45) Date of Patent: Nov. 19, 2024

(54) VIDEO RECOMMENDATION METHOD, TERMINAL DEVICE, AND COMPUTER-READABLE STORAGE MEDIUM

(71) Applicant: GUANGDONG GENIUS TECHNOLOGY CO., LTD., Dongguan (CN)

(72) Inventor: Zhifeng Wang, Dongguan (CN)

(73) Assignee: GUANGDONG GENIUS TECHNOLOGY CO., LTD., Dongguan (CN)

( * ) Notice: Subject to any disclaimer, the term of this patent is extended or adjusted under 35 U.S.C. 154(b) by 0 days.

(21) Appl. No.: 18/395,995

(22) Filed: Dec. 26, 2023

(65) Prior Publication Data

US 2024/0129584 A1    Apr. 18, 2024

Related U.S. Application Data

(63) Continuation of application No. PCT/CN2021/119194, filed on Sep. 18, 2021.

(30) Foreign Application Priority Data

Aug. 31, 2021    (CN) .......................... 202111017778.X

(51) Int. Cl.
*H04N 21/442*    (2011.01)
*G06F 18/2411*    (2023.01)
(Continued)

(52) U.S. Cl.
CPC ... *H04N 21/4668* (2013.01); *H04N 21/25891* (2013.01); *H04N 21/4666* (2013.01)

(58) Field of Classification Search
CPC ......... H04N 21/25891; H04N 21/4666; H04N 21/4668
See application file for complete search history.

(56) References Cited

U.S. PATENT DOCUMENTS

2010/0125544 A1    5/2010    Lee et al.
2021/0160571 A1    5/2021    Menendez et al.
(Continued)

FOREIGN PATENT DOCUMENTS

CN    105163142 A    12/2015
CN    109819282 A    5/2019
(Continued)

OTHER PUBLICATIONS

First Office Action issued in counterpart Chinese Patent Application No. 202111017778.X, dated Apr. 2, 2022.
(Continued)

*Primary Examiner* — Hsiungfei Peng
(74) *Attorney, Agent, or Firm* — Westbridge IP LLC

(57) ABSTRACT

Disclosed are a video commendation method, a terminal device, and a computer-readable storage medium, which are used for improving the accuracy of a terminal device in recommending a target video. The method of embodiments of the present disclosure includes acquiring identifier information of a watched video, position information of the watched video, identifier information of a current video, and position information of the current video; inputting the identifier information of the watched video and the position information of the watched video to a first model to obtain a preference vector of the watched video; inputting the preference vector of the watched video, the identifier information of the current video, and the position information of the current video to a second model to obtain a preference vector of the current video; and determining a target video according to the preference vector of the current video.

14 Claims, 4 Drawing Sheets

(51) Int. Cl.
*G06V 10/82* (2022.01)
*G06V 20/40* (2022.01)
*H04N 21/258* (2011.01)
*H04N 21/45* (2011.01)
*H04N 21/466* (2011.01)

(56) References Cited

U.S. PATENT DOCUMENTS

2021/0209491 A1   7/2021  Liu et al.
2021/0235167 A1   7/2021  Park et al.
2021/0360321 A1*  11/2021 Menendez ................ G06T 7/40

FOREIGN PATENT DOCUMENTS

CN    110795944 A    2/2020
CN    111026910 A    4/2020
CN    111506821 A    8/2020
CN    111538860 A    8/2020
WO    2021163206 A1  8/2021

OTHER PUBLICATIONS

International Search Report issued in corresponding PCT Application No. PCT/CN2021/119194, dated May 25, 2022.
Notification to Grant Patent Right for Invention issued in counterpart Chinese Patent Application No. 202111017778.X, dated Sep. 6, 2022.
Extended European Search Report issued in counterpart Europe Patent Application No. 21955642.0, dated Sep. 20, 2024.

* cited by examiner

VIDEO RECOMMENDATION METHOD, TERMINAL DEVICE, AND COMPUTER-READABLE STORAGE MEDIUM

CROSS-REFERENCE TO RELATED APPLICATIONS

This application is a continuation of International Application No. PCT/CN2021/119194, filed on Sep. 18, 2021, which claims priority to Chinese Patent Application No. CN202111017778.X, filed on Aug. 31, 2021. All of the aforementioned applications are incorporated herein by reference in their entireties.

TECHNICAL FIELD

The present disclosure relates to the field of applications of terminal devices, and in particular, to a video recommendation method, a terminal device, and a computer-readable storage medium.

BACKGROUND

With the advancement of science and technology and the popularization of Internet, more and more users like to socialize on application software such as video application software and chat application software.

At present, when a user uses a kind of application software to socialize, some software will actively recommend videos. A traditional manual recommendation method is as follows: A system recommends a target video by means of manual review, manual scoring, and manual weighting. Gradually, the way of recommending the target video by a terminal device has transitioned from the traditional manual video recommendation method to a traditional machine learning method. In the traditional machine learning method, the process of video learning recommendation is relatively complex, but processing methods for different videos are the same. Both the traditional manual video recommendation method and the traditional machine learning method may cause poor accuracy of the terminal device in recommending the target video.

SUMMARY

Embodiments of the present disclosure provide a video commendation method, a terminal device, and a computer-readable storage medium, which are used for improving the accuracy of a terminal device in recommending a target video.

A first aspect of the embodiments of the present disclosure provides a video recommendation method, which can include:
  acquiring identifier information of a watched video, position information of the watched video, identifier information of a current video, and position information of the current video;
  inputting the identifier information of the watched video and the position information of the watched video to a first model to obtain a preference vector of the watched video;
  inputting the preference vector of the watched video, the identifier information of the current video, and the position information of the current video to a second model to obtain a preference vector of the current video; and
  determining a target video according to the preference vector of the current video.

A second aspect of the embodiments of the present disclosure provides a terminal device, which can include:
  an acquisition module, configured to acquire identifier information of a watched video, position information of the watched video, identifier information of a current video, and position information of the current video; and
  a processing module, configured to: input the identifier information of the watched video and the position information of the watched video to a first model to obtain a preference vector of the watched video, input the preference vector of the watched video, the identifier information of the current video, and the position information of the current video to a second model to obtain a preference vector of the current video, and determine a target video according to the preference vector of the current video.

A third aspect of the embodiments of the present disclosure provides a terminal device, which can include:
  a memory, storing executable program codes; and
  a processor, coupled to the memory,
  wherein the processor calls the executable program codes stored in the memory, and the executable program codes, when executed by the processor, cause the processor to implement the method described in the first aspect of the embodiments of the present disclosure.

A fourth aspect of the embodiments of the present disclosure provides a computer-readable storage medium, configured to store executable program codes, wherein the executable program codes, when executed by a processor, implement the method described in the first aspect of the embodiments of the present disclosure.

A fifth aspect of the embodiments of the present disclosure discloses a computer program product. The computer program product, when run on a computer, causes the computer to implement any method described in the first aspect of the embodiments of the present disclosure.

A sixth aspect of the embodiments of the present disclosure discloses an application publishing platform. The application publishing platform is configured to publish a computer program product. The computer program product, when run on a computer, causes the computer to perform any method described in the first aspect of the embodiments of the present disclosure.

It can be seen from the above technical solutions that the embodiments of the present disclosure have the following advantages.

In the embodiments of the present disclosure, identifier information of a watched video, position information of the watched video, identifier information of a current video, and position information of the current video are acquired; the identifier information of the watched video and the position information of the watched video are input to a first model to obtain a preference vector of the watched video; the preference vector of the watched video, the identifier information of the current video, and the position information of the current video are input to a second model to obtain a preference vector of the current video; and a target video is determined according to the preference vector of the current video. That is, the terminal device completes recommendation of the target video by modeling the watched video and the current video. This method can improve the accuracy of the target video recommended by the terminal device.

BRIEF DESCRIPTION OF THE DRAWINGS

In order to explain the technical solutions of the embodiments of the present disclosure more clearly, the following will briefly introduce the accompanying drawings used in the embodiments. Apparently, the drawings in the following description are only some embodiments of the present disclosure.

DETAILED DESCRIPTION OF THE EMBODIMENTS

Embodiments of the present disclosure provide a video commendation method, a terminal device, and a computer-readable storage medium, which are used for improving the accuracy of a terminal device in recommending a target video.

In order to make a person skilled in the art to better understand the solutions of the present disclosure, the technical solutions in the embodiments of the present disclosure are described below with reference to the accompanying drawings in the embodiments of the present disclosure the described embodiments are merely some rather than all of the embodiments of the present disclosure. The embodiments in the present disclosure shall all fall within the protection scope of the present disclosure.

It can be understood that the terminal devices involved in the embodiments of the present disclosure may include a general handheld electronic terminal device with a screen, such as a mobile phone, a smartphone, a portable terminal, a terminal, a Personal Digital Assistant (PDA), a Personal Media Player (PMP) apparatus, a laptop, a Note Pad, a Wireless Broadband (Wibro) terminal, a Personal Computer (PC), a smart PC, a Point of Sales (POS), and a car computer.

The terminal device can also include a wearable device. The wearable device is a portable electronic device that can be directly worn by a user or integrated into clothes or an accessory of the user. The wearable device is not just a hardware device, but can also achieve powerful intelligent functions through software support, data exchange, and cloud interaction, such as a computing function, a positioning function, and an alarm function. It can also be connected to a mobile phone and various terminals. The wearable device can include but is not limited to watch products supported by the wrist (such as a watch and a wristband), shoe products supported by the feet (such as shoes, socks, or other products worn on the legs), glass products supported by the head (such as glasses, helmets, and headband), and all kinds of non-mainstream product forms such as smart clothing, backpacks, crutches, and accessories.

It should be noted that the terminal device involved in the embodiments of the present disclosure is provided with a Transformer model. The Transformer model has a complete Encoder-Decoder frame and is used for determining a target video. A first model is arranged in an encoder. The first model is used for modeling a preference vector of a user for a watched video. A second model is arranged in the decoder. The second model is used for modeling a preference vector of the user for a current video.

Figure 1:
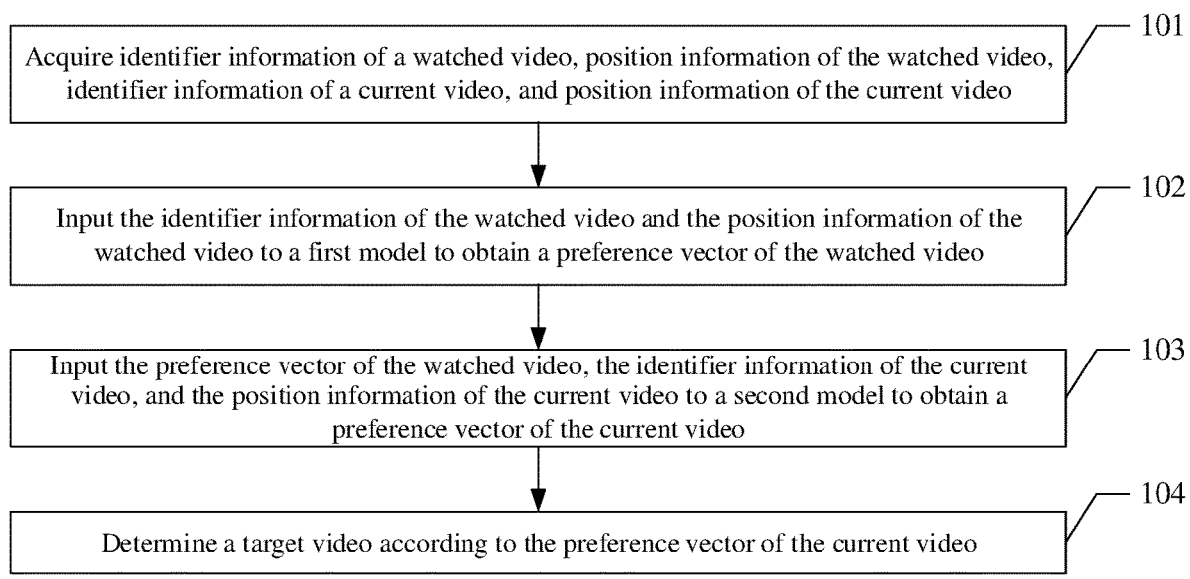
FIG. 1 is a schematic diagram of an embodiment of a video recommendation method in the embodiments of the present disclosure.

The technical solutions of the present disclosure will be further explained below by the embodiments. FIG. 1 shows a schematic diagram of an embodiment in the embodiments of the present disclosure, which can include:

FIG. 1 is a schematic diagram of an embodiment of a video recommendation method in the embodiments of the present disclosure. The video recommendation method can include:

101, identifier information of a watched video, position information of the watched video, identifier information of a current video, and position information of the current video are acquired.

It can be understood that the identifier information of the watched video may include but is not limited to an Identity Document (ID) of the watched video. The ID of the watched video can be referred to as a serial number of the watched video or a watched video account. The identifier information of the watched video is a relatively unique number in the watched video.

The position information of the watched video refers to position information of the watched video on a display page and/or a display page where the watched video is located. Optionally, the position information of the watched video can include a page position and page number of the watched video.

The identifier information of the current video can include but is not limited to an ID of the current video, and the ID of the current video can be referred to as a serial number of the current video or a current video account. The identifier information of the current video is a relatively unique number in the current video.

The position information of the current video refers to position information of the current video on a display page and/or a display page where the watched video is located. Optionally, the position information of the current video can include a page position and page number of the current video.

Optionally, the watched video can be, but is not limited to, a video that has been played for 5 seconds (s), a video that has been played for 45 s, a video that has been played by 80%. The current video can be, but is not limited to, a video that has been played for 5 seconds (s), a video that has been played for 45 s, a video that has been played by 80%.

Optionally, the watched video can include a watched video sequence (seq). The current video includes a current video sequence. For example, the identifier information of the watched video includes identifier information of the watched video sequence.

102, the identifier information of the watched video and the position information of the watched video are input to a first model to obtain a preference vector of the watched video.

Optionally, the terminal device inputs the identifier information of the watched video and the position information of the watched video to a first model to obtain a preference vector of the watched video, which can include: the terminal device inputs the identifier information of the watched video and the position information of the watched video to a first target model to obtain an interest preference vector of the watched video; and the terminal device inputs the interest preference vector of the watched video to a second target model to obtain the preference vector (feat) of the watched video.

The first model can include the first target model and the second target model.

Optionally, the terminal device inputs the identifier information of the watched video and the position information of the watched video to a first target model to obtain an interest preference vector of the watched video, which can include: the terminal device obtains a first interest preference parameter according to the identifier information of the watched video and the position information of the watched video; the terminal device obtains a second interest preference parameter according to the first interest preference parameter; and the terminal device obtains the interest preference vector of the watched video according to the second interest preference parameter.

Optionally, the terminal device obtains a first interest preference parameter according to the identifier information of the watched video and the position information of the watched video, which can include: the terminal device obtains the first interest preference parameter according to a first formula.

The first formula is Attention $(Q_1, K_1, V_1)$=softmax $[(Q_1 K_1 T/\sqrt{d_{k1}})]V_1$; $Q_1=W_i^{Q1}(x_1+p_1)$; $K_1=W_i^{K1}(x_1+p_1)$; $V_1=W_i^{V1}(x_1+p_1)$;

Attention $(Q_1, K_1, V_1)$ represents the first interest preference parameter;

softmax $[(Q_1 K_1 T/\sqrt{d_{k1}})]$ represents a first normalized index softmax function;

$Q_1$ represents a feature vector of the watched video in a first Query layer; $K_1$ represents a feature vector of the watched video in a first Key layer; $V_1$ represents a feature vector of the watched video in a first Value layer;

$W_i^{Q1}$ represents a weight matrix of the first Query layer;
$W_i^{K1}$ represents a weight matrix of the first Key layer;
$W_i^{V1}$ represents a weight matrix of the first Value layer;
$x_1$ represents the identifier information of the watched video; $p_1$ represents the position information of the watched video; the position information of the watched video comprises position information of the watched video on a display page and/or a display page where the watched video is located; and $d_{k1}$ represents a first input dimension.

It can be understood that $p_1$ is the position information Positional_Encoding of the watched video.

It should be noted that a result obtained by performing dot product operation on $Q_1$ and $K_1^T$ will become larger and larger. Therefore, the terminal device will multiply this result by $1/\sqrt{d_{k1}}$ to reduce the result, where $1/\sqrt{d_{k1}}$ is a first scaling factor. The first scaling factor is used for normalization, so that the result will not become too large.

It can be understood that $Q_1$ can be considered as being formed by concatenating A vectors with a dimension $d_{Q1}$; $K_1$ can be considered as being concatenating B vectors with a dimension $d_{k1}$; and $d_{Q1}$ can be equal to $d_{k1}$, both of which represent the first input dimension, where A and B are integers greater than or equal to 1.

Dimensions of $Q_1$ and $K_1$ are the same, and dimensions of $Q_1$ and $V_1$ can be the same or different. Lengths of $K_1$ and $V_1$ are the same, and lengths of $Q_1$ and $K_1$ can be the same or different. Dimensions of Attention $(Q_1, K_1, V_1)$ and $V_1$ are the same, and lengths of Attention $(Q_1, K_1, V_1)$ and $Q_1$ are the same.

$Q_1$, $K_1$, and $V_1$ can be the same.
$W_i^{Q1}$, $W_i^{K1}$, and $W_i^{V1}$ are linear transformation matrices in an encoder.

Optionally, the terminal device obtains a second interest preference parameter according to the first interest preference parameter, which can include: the terminal device obtains the second interest preference parameter according to a second formula.

The second formula is head$_i$=Attention $(Q_1 W_i^{Q1}, K_1 W_i^{K1}, V_1 W_i^{V1})$; head$_i$ represents the second interest preference parameter.

Optionally, the terminal device obtains the interest preference vector of the watched video according to the second interest preference parameter, which can include: the terminal device obtains the interest preference vector of the watched video according to a third formula.

The third formula is MultiHead $(Q_1, K_1, V_1)$=Concat (head$_1$, head$_2$, . . . head$_i$)$W^{O1}$; MultiHead $(Q_1, K_1, V_1)$ represents the interest preference vector of the watched video; Concat (head$_1$, head$_2$, . . . head$_i$) represents a first concatenate function; and $W^{O1}$ represents a weight matrix of a first MultiHead layer.

It can be understood that the first formula, the second formula, and the third formula are formulas in the first target model. The first formula, the second formula, and the third formula are completed in a multi-head attention layer of the encoder.

Optionally, the terminal device inputs the interest preference vector of the watched video to a second target model to obtain the preference vector of the watched video, which can include: the terminal device inputs the interest preference vector of the watched video to a first feed forward neural network to obtain the preference vector of the watched video.

The first feed forward neural network is FFN $(y_1)$=ReLU$_1$ $(y_1 H_{11}+b_{11})$ $H_{12}+b_{12}$; $y_1$=MultiHead $(Q_1, K_1, V_1)$;

$y_1$ represents the interest preference vector of the watched video;

ReLU$_1$($y_1 H_{11}+b_{11}$) $H_{12}$ represents an activation function of a first layer in the first feed forward neural network; ReLU$_1$($y_1 H_{11}+b_{11}$) $H_{12}+b_{12}$ represents a linear activation function of a second layer in the first feed forward neural network;

$H_{11}$ represents a weight matrix of the first layer in the first feed forward neural network; $H_{12}$ represents a weight matrix of the second layer in the first feed forward neural network;

$b_{11}$ represents a bias term of the first layer in the first feed forward neural network; and $b_{12}$ represents a bias term of the second layer in the first feed forward neural network.

It can be understood that $H_{11}$ and $H_{12}$ can be the same or different, and $b_{11}$ and $b_{12}$ can be the same or different. No specific limitations are made on this.

103, the preference vector of the watched video, the identifier information of the current video, and the position information of the current video are input to a second model to obtain a preference vector of the current video.

Optionally, the terminal device inputs the preference vector of the watched video, the identifier information of the current video, and the position information of the current video are input to a second model to obtain a preference vector of the current video, which can include: the terminal device obtains a third interest preference parameter according to the preference vector of the watched video, the identifier information of the current video, and the position information of the current video; the terminal device obtains a fourth interest preference parameter according to the third interest preference parameter; the terminal device obtains an interest preference vector of the current video according to the fourth interest preference parameter; and the terminal device inputs the interest preference vector of the current video to a third target model to obtain the preference vector of the current video.

The second model includes the third target model.

Optionally, the preference vector of the watched video includes a feature vector of the current video on a second Key layer and a feature vector of the current video on a second Value layer.

Optionally, the terminal device obtains a third interest preference parameter according to the preference vector of the watched video, the identifier information of the current video, and the position information of the current video, which can include: the terminal device obtains the third interest preference parameter according to a fourth formula.

The fourth formula is Attention $(Q_2, K_2, V_2)$=softmax $[(Q_2 K_2^T/\sqrt{d_{k2}})]V_2$; $Q_2 = W_i^{Q2}(x_2 + p_2)$;

Attention $(Q_2, K_2, V_2)$ represents the third interest preference parameter;

softmax $[(Q_2 K_2^T/\sqrt{d_{k2}})]$ represents a second normalized index softmax function;

$Q_2$ represents a feature vector of the current video in a second Query layer; $K_2$ represents the feature vector of the current video in the Key layer; $V_2$ represents the feature vector of the current video in a second Value layer;

$W_i^{Q2}$ represents a weight matrix of the second Query layer; $W_i^{K2}$ represents a weight matrix of the second Key layer; $W_i^{V2}$ represents a weight matrix of the second Value layer;

$x_2$ represents the identifier information of the current video; $p_2$ represents the position information of the current video; the position information of the current video comprises position information of the current video on a display page and/or a display page where the current video is located; and $d_{k2}$ represents a second input dimension.

It can be understood that $p_2$ is the position information Positional_Encoding of the current video.

It should be noted that a result obtained by performing dot product operation on $Q_2$ and $K_2^T$ will become larger and larger. Therefore, the terminal device will multiply this result by $2/\sqrt{d_{k2}}$ to reduce the result, where $2/\sqrt{d_{k2}}$ is a first scaling factor. The first scaling factor is used for normalization, so that the result will not become too large.

It can be understood that $Q_2$ can be considered as being formed by concatenating A vectors with a dimension $d_{Q2}$; $K_2$ can be considered as being concatenating B vectors with a dimension $d_{k2}$; and $d_{Q2}$ can be equal to $d_{k2}$, both of which represent the first input dimension, where A and B are integers greater than or equal to 2.

Dimensions of $Q_2$ and $K_2$ are the same, and dimensions of $Q_2$ and $V_2$ can be the same or different. Lengths of $K_2$ and $V_2$ are the same, and lengths of $Q_2$ and $K_2$ can be the same or different. Dimensions of Attention $(Q_2, K_2, V_2)$ and $V_2$ are the same, and lengths of Attention $(Q_2, K_2, V_2)$ and $Q_2$ are the same.

$Q_2$, $K_2$, and $V_2$ can be the same.

$Wi^{Q2}$, $W_i^{K2}$, and $W_i^{V2}$ are linear transformation matrices in a decoder.

Optionally, the terminal device obtains a fourth interest preference parameter according to the third interest preference parameter, which can include: the terminal device obtains the fourth interest preference parameter according to a fifth formula.

The fifth formula is head$'_i$=Attention $(Q_2 W_i^{Q2}, K_2 W_i^{K2}, V_2 W_i^{V2})$; head$'_i$ represents the fourth interest preference parameter.

Optionally, the terminal device obtains the interest preference vector of the current video according to the fourth interest preference parameter, which can include: the terminal device obtains the interest preference vector of the current video according to a sixth formula.

The sixth formula is MultiHead $(Q_2, K_2, V_2)$=Concat (head$'_1$, head$'_2$, ... head$'_i$) $W^{O2}$; MultiHead $(Q_2, K_2, V_2)$ represents the interest preference vector of the current video; Concat (head$'_1$, head$'_2$, ... head$'_i$) represents a second concatenate function; and $W^{O2}$ represents a weight matrix of a second MultiHead layer.

It can be understood that the fourth formula, the fifth formula, and the sixth formula are formulas in the second target model. The fourth formula, the fifth formula, and the sixth formula are completed in a multi-head attention layer of the decoder.

Optionally, the terminal device inputs the interest preference vector of the current video to a third target model to obtain the preference vector of the current video, which can include: the terminal device inputs the interest preference vector of the current video to a second feed forward neural network to obtain the preference vector of the current video.

where the second feed forward neural network is FFN $(y_2)$=ReLU$_2(y_2 H_{21} + b_{21}) H_{22} + b_{22}$; $y_2$=MultiHead $(Q_2, K_2, V_2)$;

$y_2$ represents the interest preference vector of the current video;

ReLU$_2(y_2 H_{21} + b_{21}) H_{22}$ represents an activation function of a first layer in the second feed forward neural network; ReLU$_2(y_2 H_{21} + b_{21}) H_{22} + b_{22}$ represents a linear activation function of a second layer in the first feed forward neural network;

$H_{21}$ represents a weight matrix of the first layer in the second feed forward neural network; $H_{22}$ represents a weight matrix of the second layer in the second feed forward neural network;

$b_{21}$ represents a bias term of the first layer in the second feed forward neural network; and $b_{22}$ represents a bias term of the second layer in the second feed forward neural network.

It can be understood that $H_{21}$ and $H_{22}$ can be the same or different, and $b_{21}$ and $b_{22}$ can be the same or different. $H_{11}$ and $H_{21}$ can be the same or different, and $b_{11}$ and $b_{21}$ can be the same or different. No specific limitations are made on this.

Figure 2:
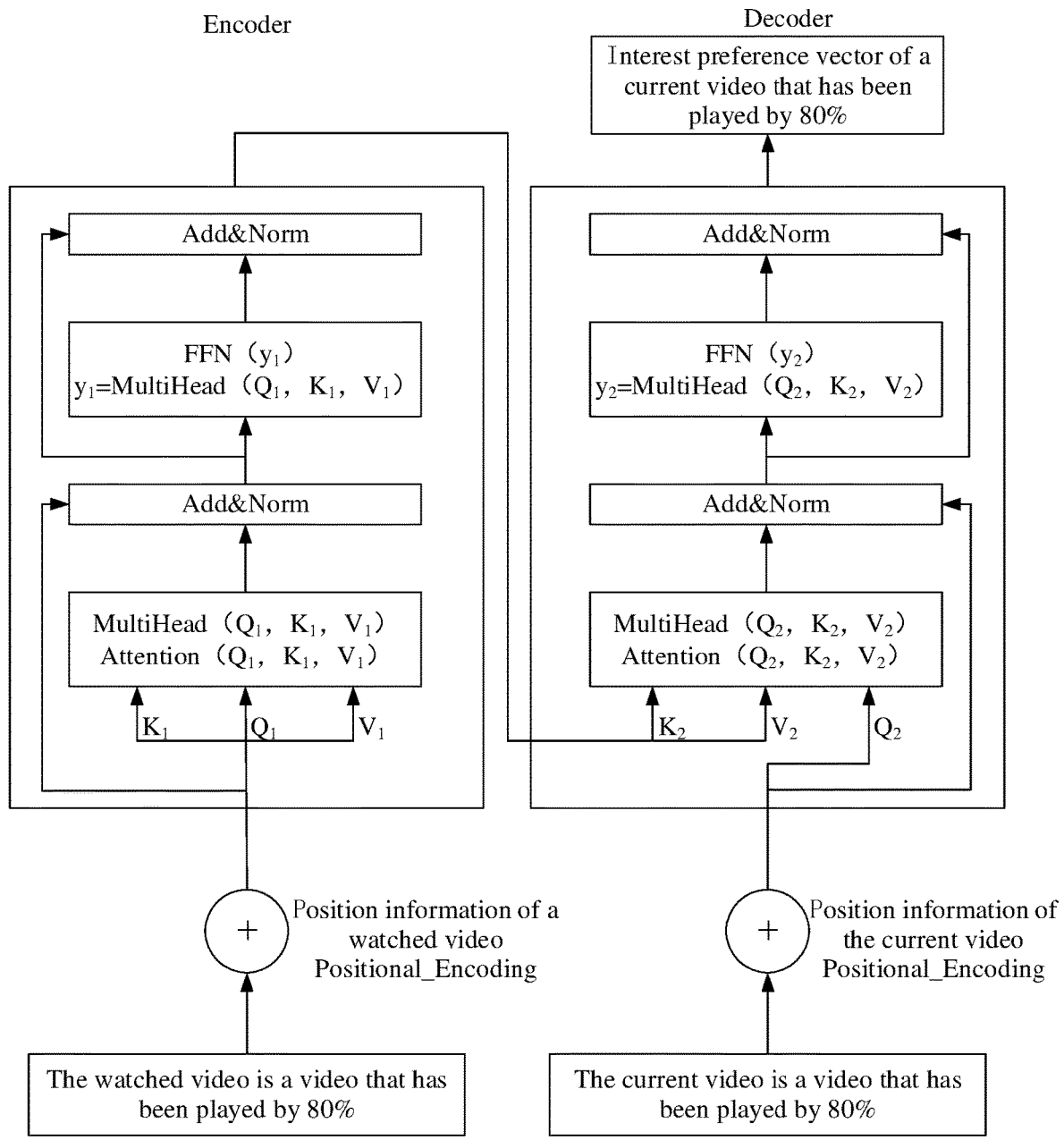
FIG. 2 is a schematic diagram of an embodiment of an Encoder-Decoder frame in the embodiments of the present disclosure.

Exemplarily, FIG. 2 is a schematic diagram of an embodiment of an Encoder-Decoder frame in the embodiments of the present disclosure. In FIG. 2, the watched video is a video that has been played by 80%, and the current video is a video that has been played by 80%.

It can be understood that the Encoder-Decoder frame in FIG. 2 can be referred to as an interest extraction network structure of the current video.

104, a target video is determined according to the preference vector of the current video.

Optionally, the terminal device determines a target video according to the preference vector of the current video, which can include: the terminal device inputs a preference vector corresponding to a first current video to each of N expert networks, wherein a proportion of the preference vector corresponding to the first current video in each expert network is different, a being-selected weight corresponding to each expert network is different, and N is a positive integer greater than or equal to 1; the terminal device outputs a target preference vector corresponding to the first current video according to the proportion of the preference vector corresponding to the first current video in each expert network and the being-selected weight corresponding to each expert network; the terminal device obtains N target preference vectors corresponding to N current videos; and the terminal device determines N target videos according to the N target preference vectors.

It can be understood that the being-selected weight corresponding to the expert network can be referred to as a gate.

Optionally, the terminal device outputs a target preference vector corresponding to the first current video according to the proportion of the preference vector corresponding to the first current video in each expert network and the being-selected weight corresponding to each expert network, which can include: the terminal device performs weighted summation on the proportion of the preference vector corresponding to the first current video in each expert network and the being-selected weight corresponding to each expert network, and outputs a target preference vector corresponding to the first current video.

Optionally, the terminal device performs weighted summation on the proportion of the preference vector corresponding to the first current video in each expert network and the being-selected weight corresponding to each expert network, and outputs a target preference vector corresponding to the first current video, which can include but is not limited to the following implementations.

Implementation 1

The terminal device obtains the target preference vector corresponding to the first current video according to a seventh formula.

The seventh formula is $f^k(z)=\sum_{i=1}^{N} g_i^k(z) f_i(z)$, $i=1, 2, \ldots, n$, where $f^k(z)$ represents the target preference vector corresponding to the first current video;

$g_i^k(z)$ represents the being-selected weight corresponding to an $i^{th}$ expert network; and $f_i(z)$ represents the proportion of the preference vector corresponding to an ith video in the first current video in the ith expert network.

It can be understood that different expert networks can process different subtasks, and there is a coupling relationship between different subtasks, so that processed subtasks are more accurate. The subtask can be a watched video; and the processed subtask can be a target video (Task).

Implementation 2

The terminal device performs weighted summation on the proportion of the preference vector corresponding to the first current video in each expert network and the being-selected weight corresponding to each expert network, and outputs a preference vector parameter corresponding to the first current video; and the terminal device outputs, in a case that a value of the preference vector parameter is greater than a preset parameter threshold, the target preference vector corresponding to the first current video.

It should be noted that the preset parameter threshold can be set by the terminal device before delivery or customized by a user. No specific limitations will be made on this.

The preset parameter threshold can be defined by a Tower model. The Tower model is used for determining whether to output the target preference vector corresponding to the first current video.

Optionally, the terminal device outputs, in a case that a value of the preference vector parameter is greater than a preset parameter threshold, the target preference vector corresponding to the first current video, which can include: the terminal device obtains a first parameter in a case that the value of the preference vector parameter is greater than the preset parameter threshold; and the terminal device adds a result output by a bias deep neural network (Bias DNN) to the first parameter to obtain the target preference vector corresponding to the first current video.

It can be understood that the Bias DNN can be referred to as a bias network. The bias network is used for adjusting a preference vector parameter, which can improve the flexibility of the Tower model.

Figure 3:
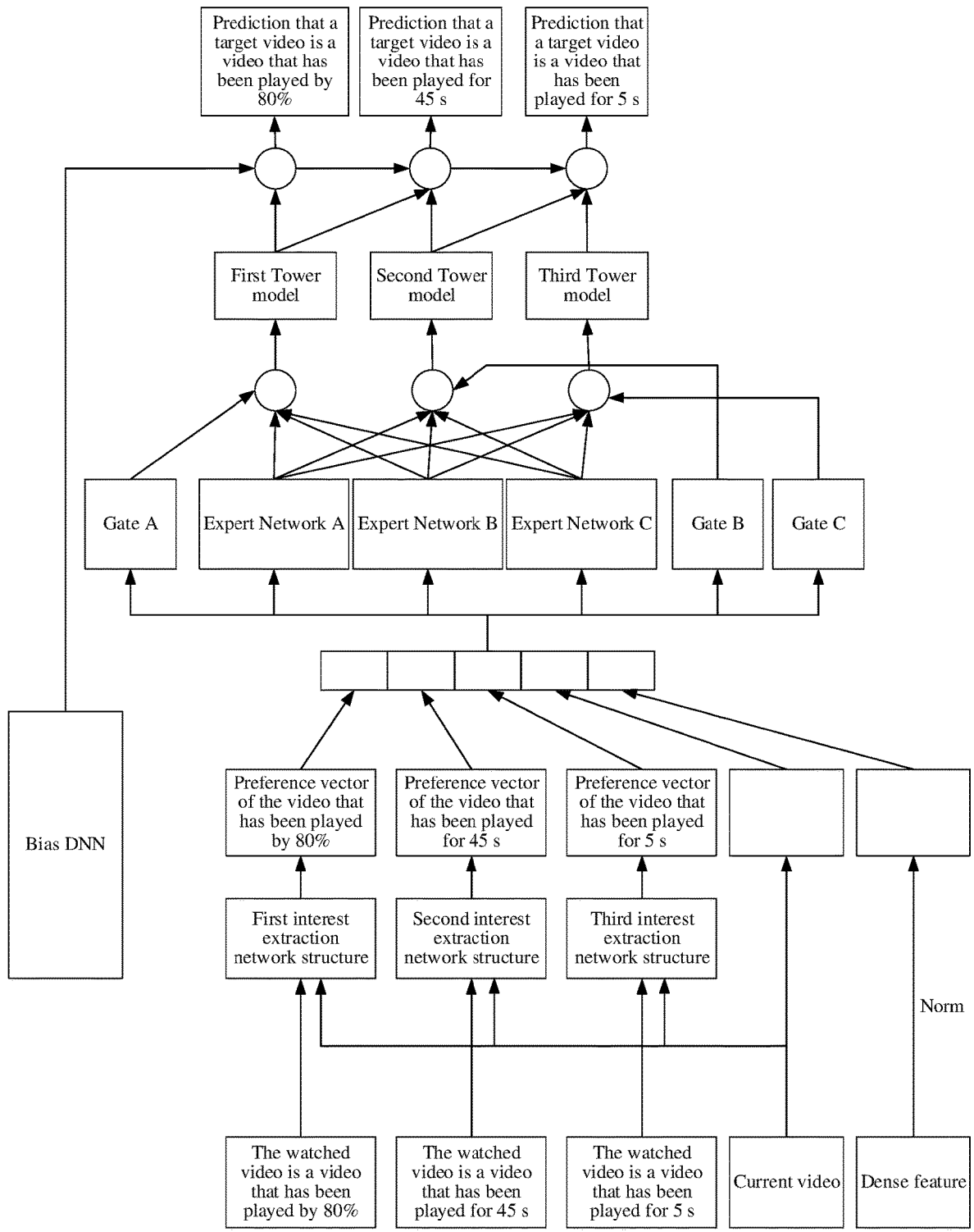
FIG. 3 is a schematic diagram of another embodiment of a video recommendation method in the embodiments of the present disclosure.

Exemplarily, FIG. 3 is a schematic diagram of another embodiment of a video recommendation method in the embodiments of the present disclosure. In FIG. 3, the watched video is a video that has been played for 5 s, a video that has been played for 45 s, and a video that has been played by 80%. A target video Task is prediction of the video that has been played for 5 s, prediction of the video that has been played for 45 s, and prediction of the video that has been played by 80%.

In the embodiments of the present disclosure, identifier information of a watched video, position information of the watched video, identifier information of a current video, and position information of the current video are acquired; the identifier information of the watched video and the position information of the watched video are input to a first model to obtain a preference vector of the watched video; the preference vector of the watched video, the identifier information of the current video, and the position information of the current video are input to a second model to obtain a preference vector of the current video; and a target video is determined according to the preference vector of the current video. That is, the terminal device completes recommendation of the target video by modeling the watched video and the current video. This method can improve the accuracy of the target video recommended by the terminal device.

Figure 4:
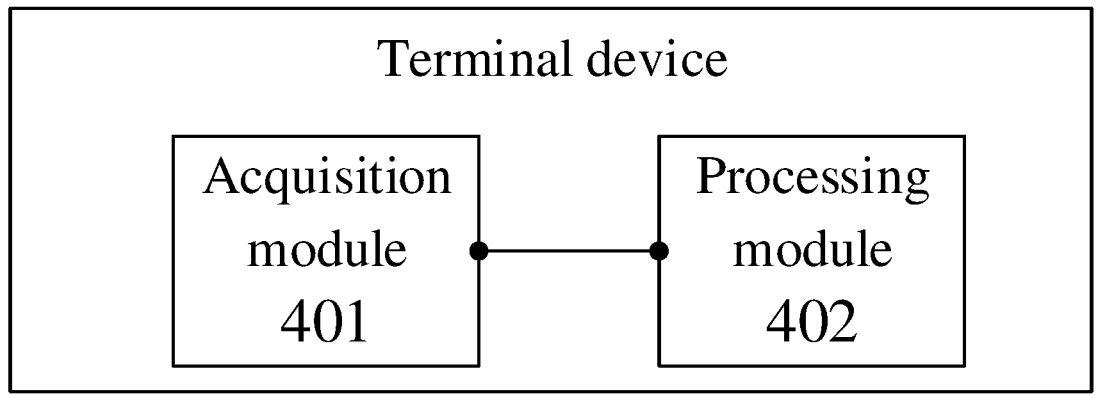
FIG. 4 is a schematic diagram of an embodiment of a terminal device in the embodiments of the present disclosure.

FIG. 4 is a schematic diagram of an embodiment of a terminal device in the embodiments of the present disclosure, which can include: an acquisition module 401 and a processing module 402.

The acquisition module 401 is configured to acquire identifier information of a watched video, position information of the watched video, identifier information of a current video, and position information of the current video.

The processing module 402 is configured to: input the identifier information of the watched video and the position information of the watched video to a first model to obtain a preference vector of the watched video, input the preference vector of the watched video, the identifier information of the current video, and the position information of the current video to a second model to obtain a preference vector of the current video, and determine a target video according to the preference vector of the current video.

Optionally, in some embodiments of the present disclosure, the processing module 402 is specifically configured to: input the identifier information of the watched video and the position information of the watched video to a first target model to obtain an interest preference vector of the watched video; and input the interest preference vector of the watched video to a second target model to obtain a preference vector of the watched vector. The first model includes the first target model and the second target model.

Optionally, in some embodiments of the present disclosure, the processing module 402 is specifically configured to: obtain a first interest preference parameter according to the identifier information of the watched video and the position information of the watched video; obtain a second interest preference parameter according to the first interest preference parameter; and obtain the interest preference vector of the watched video according to the second interest preference parameter.

Optionally, in some embodiments of the present disclosure, the processing module 402 is specifically configured to obtain the first interest preference parameter according to a first formula, wherein the first formula is Attention $(Q_1, K_1, V_1)$=softmax $[(Q_1 K_1 T/\sqrt{d_{k1}})]V_1$; $Q_1 = W_i^{Q1}(x_1+p_1)$; $K_1 = W_i^{K1}(x_1+p_1)$; $V_1 = W_i^{V1}(x_1+p_1)$; Attention $(Q_1, K_1, V_1)$ represents the first interest preference parameter; softmax $[(Q_1 K_1 T/\sqrt{d_{k1}})]$ represents a first normalized index softmax function; $Q_1$ represents a feature vector of the watched video in a first Query layer; $K_1$ represents a feature vector of the watched video in a first Key layer; $V_1$ represents a feature vector of the watched video in a first Value layer; $W_i^{Q1}$ represents a weight matrix of the first Query layer; $W_i^{K1}$ represents a weight matrix of the first Key layer; $W_i^{V1}$ represents a weight matrix of the first Value layer; $x_1$ represents the identifier information of the watched video; $p_1$ represents the position information of the watched video; the position information of the watched video comprises position information of the watched video on a display page and/or a display page where the watched video is located; and $d_{k1}$ represents a first input dimension.

Optionally, in some embodiments of the present disclosure, the processing module 402 is specifically configured to obtain the second interest preference parameter according to a second, formula, where the second formula is $head_i$=Attention $(Q_1 W_i^{Q1}, K_1 W_i^{K1}, V_1 W_i^{V1})$; $head_i$ represents the second interest preference; the processing module 402 is specifically configured to obtain the interest preference vector of the watched video according to a third formula, where the third formula is MultiHead $(Q_1, K_1, V_1)$=Concat $(head_1, head_2, \ldots, head_i)W^{O1}$; MultiHead $(Q_1, K_1, V_1)$ represents the interest preference vector of the watched video; Concat $(head_1, head_2, \ldots, head_i)$ represents a first concatenate function; and $W^{O1}$ represents a weight matrix of a first MultiHead layer.

Optionally, in some embodiments of the present disclosure, the processing module 402 is specifically configured to input the interest preference vector of the watched video to a first feed forward neural network to obtain the preference vector of the watched video, wherein the first feed forward neural network is FFN $(y_1)$=ReLU$_1(y_1 H_{11}+b_{11})$ $H_{12}+b_{12}$; $y_1$=MultiHead $(Q_1, K_1, V_1)$; $y_1$ represents the interest preference vector of the watched video; ReLU$_1(y_1 H_{11}+b_{11})$ $H_{12}$ represents an activation function of a first layer in the first feed forward neural network; ReLU$_1(y_1 H_{11}+b_{11})$ $H_{12}+b_{12}$ represents a linear activation function of a second layer in the first feed forward neural network; H11 represents a weight matrix of the first layer in the first feed forward neural network; $H_{12}$ represents a weight matrix of the second layer in the first feed forward neural network; $b_{11}$ represents a bias term of the first layer in the first feed forward neural network; and $b_{12}$ represents a bias term of the second layer in the first feed forward neural network.

Optionally, in some embodiments of the present disclosure, the processing module 402 is specifically configured to: obtain a third interest preference parameter according to the preference vector of the watched video, the identifier information of the current video, and the position information of the current video; obtain a fourth interest preference parameter according to the third interest preference parameter; obtain an interest preference vector of the current video according to the fourth interest preference parameter; and input the interest preference vector of the current video to a third target model to obtain the preference vector of the current video. The second model includes the third target model.

Optionally, in some embodiments of the present disclosure, the preference vector of the watched video includes a feature vector of the current video in a second Key layer and a feature vector of the current video in a second Value layer; the processing module 402 is specifically configured to: obtain the third interest preference parameter according to a fourth formula, wherein the fourth formula is Attention $(Q_2, K_2, V_2)$=softmax $[(Q_2 K_2^T/\sqrt{d_{k2}})]V_2$; $Q_2=W_i^{Q2}(x_2+p_2)$, where Attention $(Q_2, K_2, V_2)$ represents the third interest preference parameter; softmax $[Q_2 K_2^T/\sqrt{d_{k2}})]$ represents a second normalized index softmax function; $Q_2$ represents a feature vector of the current video in a second Query layer; $K_2$ represents the feature vector of the current video in the Key layer; $V_2$ represents the feature vector of the current video in a second Value layer; $W_i^{Q2}$ represents a weight matrix of the second Query layer; $W_i^{K2}$ represents a weight matrix of the second Key layer; $W_i^{V2}$ represents a weight matrix of the second Value layer; $x_2$ represents the identifier information of the current video; $p_2$ represents the position information of the current video; the position information of the current video comprises position information of the current video on a display page and/or a display page where the current video is located; and $d_{k2}$ represents a second input dimension.

Optionally, in some embodiments of the present disclosure, the processing module 402 is specifically configured to obtain the fourth interest preference parameter according to a fifth formula; the fifth formula is $head'_i$=Attention $(Q_2 W_i^{Q2}; K_2 W_i^{K2}, V_2 W_i^{V2})$ $head'_i$ represents the fourth interest preference parameter; the processing module 402 is specifically configured to obtain the interest preference vector of the current video according to a sixth formula; the sixth formula is MultiHead $(Q_2, K_2, V_2)$=Concat $(head'_1, head'_2, \ldots, head'_i)W^{O2}$; MultiHead $(Q_2, K_2, V_2)$ represents the interest preference vector of the current video; Concat $(head'_1, head'_2, \ldots head'_i)$ represents a second concatenate function; and $W^{O2}$ represents a weight matrix of a second MultiHead layer.

Optionally, in some embodiments of the present disclosure, the processing module 402 is specifically configured to input the interest preference vector of the current video to a second feed forward neural network to obtain the preference vector of the current video, wherein the second feed forward neural network is FFN $(y_2)$=ReLU$_2(y_2 H_{21}+b_{21})$ $H_{22}+b_{22}$; $y_2$=MultiHead $(Q_2, K_2, V_2)$; $y_2$ represents the interest preference vector of the current video; ReLU$_2(y_2 H^{21}+b^{21})$ $H_{22}$ represents an activation function of a first layer in the second feed forward neural network; ReLU$_2(y_2 H_{21}+b_{21})$ $H_{22}+b_{22}$ represents a linear activation function of a second layer in the first feed forward neural network; $H_{21}$ represents a weight matrix of the first layer in the second feed forward neural network; $H_{22}$ represents a weight matrix of the second layer in the second feed forward neural network; $b_{21}$ represents a bias term of the first layer in the second feed forward neural network; and $b_{22}$ represents a bias term of the second layer in the second feed forward neural network.

Optionally, in some embodiments of the present disclosure, the processing module 402 is specifically configured to: input a preference vector corresponding to a first current video to each of N expert networks, wherein a proportion of the preference vector corresponding to the first current video in each expert network is different, a being-selected weight corresponding to each expert network is different, and N is a positive integer greater than or equal to 1; output a target preference vector corresponding to the first current video according to the proportion of the preference vector corresponding to the first current video in each expert network and the being-selected weight corresponding to each expert network; obtain N target preference vectors corresponding to N current videos; and determine N target videos according to the N target preference vectors.

Optionally, in some embodiments of the present disclosure, the processing module 402 is specifically configured to: perform weighted summation on the proportion of the preference vector corresponding to the first current video in each expert network and the being-selected weight corresponding to each expert network, and output a target preference vector corresponding to the first current video.

Optionally, in some embodiments of the present disclosure, the processing module 402 is specifically configured to: perform weighted summation on the proportion of the preference vector corresponding to the first current video in each expert network and the being-selected weight corresponding to each expert network, and output a preference vector parameter corresponding to the first current video; and output, in a case that a value of the preference vector parameter is greater than a preset parameter threshold, the target preference vector corresponding to the first current video.

Figure 5:
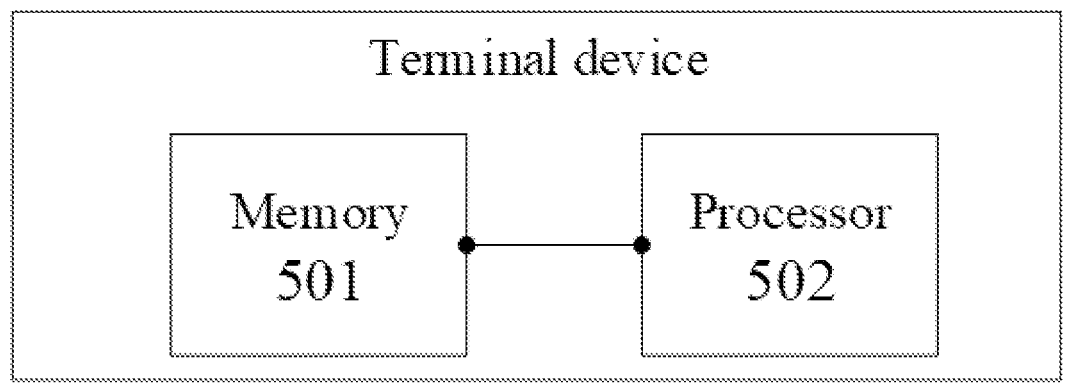
FIG. 5 is a schematic diagram of another embodiment of a terminal device in the embodiments of the present disclosure.

FIG. 5 is a schematic diagram of another embodiment of a terminal device in the embodiments of the present disclosure, which can include: a memory 501 and a processor 502. The memory 501 and the processor 502 are coupled to each other. The processor 502 can call executable program codes stored in the memory 501.

In the embodiments of the present disclosure, the processor 502 included in the terminal device also has the following functions:
- acquiring identifier information of a watched video, position information of the watched video, identifier information of a current video, and position information of the current video;
- inputting the identifier information of the watched video and the position information of the watched video to a first model to obtain a preference vector of the watched video;
- inputting the preference vector of the watched video, the identifier information of the current video, and the position information of the current video to a second model to obtain a preference vector of the current video; and
- determining a target video according to the preference vector of the current video.

Optionally, the processor 502 also has the following functions: inputting the identifier information of the watched video and the position information of the watched video to a first target model to obtain an interest preference vector of the watched video; and inputting the interest preference vector of the watched video to a second target model to obtain a preference vector of the watched vector. The first model includes the first target model and the second target model.

Optionally, the processor 502 also has the following functions: obtaining a first interest preference parameter according to the identifier information of the watched video and the position information of the watched video; obtaining a second interest preference parameter according to the first interest preference parameter; and obtaining the interest preference vector of the watched video according to the second interest preference parameter.

Optionally, the processor 502 also has the following functions: obtaining the first interest preference parameter according to a first formula, wherein the first formula is Attention $(Q_1, K_1, V_1)$=softmax $[(Q_1 K_1 T/\sqrt{d_{k1}})]V_1$; $Q_1 = W_i^{Q1}(x_1+p_1)$; $K_1 = W_i^{K1}(x_1+p_1)$; $V_1 = W_i^{V1}(x_1+p_1)$; Attention $(Q_1, K_1, V_1)$ represents the first interest preference parameter; softmax $[(Q_1 K_1 T/\sqrt{d_{k1}})]$ represents a first normalized index softmax function; $Q_1$ represents a feature vector of the watched video in a first Query layer; $K_1$ represents a feature vector of the watched video in a first Key layer; $V_1$ represents a feature vector of the watched video in a first Value layer; $W_i^{Q1}$ represents a weight matrix of the first Query layer; $W_i^{K1}$ represents a weight matrix of the first Key layer; $W_i^{V1}$ represents a weight matrix of the first Value layer; $x_1$ represents the identifier information of the watched video; $p_1$ represents the position information of the watched video; the position information of the watched video comprises position information of the watched video on a display page and/or a display page where the watched video is located; and $d_{k1}$ represents a first input dimension.

Optionally, the processor 502 also has the following functions: obtaining the second interest preference parameter according to a second formula, wherein the second formula is $head_i$=Attention $(Q_1 W_i^{Q1}, K_1 W_i^{K1}, V_1 W_i^{V1})$; $head_i$ represents the second interest preference; and
  obtaining the interest preference vector of the watched video according to a third formula, wherein the third formula is MultiHead $(Q_1, K_1, V_1)$=Concat $(head_1, head_2, \ldots head_i)W^{O1}$; MultiHead $(Q_1, K_1, V_1)$ represents the interest preference vector of the watched video; Concat $(head_1, head_2, \ldots head_i)$ represents a first concatenate function; and $W^{O1}$ represents a weight matrix of a first MultiHead layer.

Optionally, the processor 502 also has the following functions: inputting the interest preference vector of the watched video to a first feed forward neural network to obtain the preference vector of the watched video, wherein the first feed forward neural network is FFN $(y_1)$=ReLU$_1$ $(y_1 H_{11}+b_{11})$ $H_{12}+b_{12}$; $y_1$=MultiHead $(Q_1, K_1, V_1)$; $y_1$ represents the interest preference vector of the watched video; ReLU$_1$$(y_1 H_{11}+b_{11})$ $H_{12}$ represents an activation function of a first layer in the first feed forward neural network; ReLU$_1$ $(y_1 H_{11}+b_{11})$ $H_{12}+b_{12}$ represents a linear activation function of a second layer in the first feed forward neural network; H11 represents a weight matrix of the first layer in the first feed forward neural network; $H_{12}$ represents a weight matrix of the second layer in the first feed forward neural network; $b_{11}$ represents a bias term of the first layer in the first feed forward neural network; and bit represents a bias term of the second layer in the first feed forward neural network.

Optionally, the processor 502 also has the following functions: obtaining a third interest preference parameter according to the preference vector of the watched video, the identifier information of the current video, and the position information of the current video; obtaining a fourth interest preference parameter according to the third interest preference parameter; obtaining an interest preference vector of the current video according to the fourth interest preference parameter; and inputting the interest preference vector of the current video to a third target model to obtain the preference vector of the current video. The second model includes the third target model.

Optionally, the processor 502 also has the following functions: in a case that the preference vector of the watched video includes a feature vector of the current video in a second Key layer and a feature vector of the current video in a second Value layer, obtaining the third interest preference parameter according to a fourth formula, wherein the fourth formula is Attention $(Q_2, K_2, V_2)$=softmax $[(Q_2K_2^T/\sqrt{d_{k2}})]V_2$; $Q_2=W_i^{Q2}(x_2+p_2)$; Attention $(Q_2, K_2, V_2)$ represents the third interest preference parameter; softmax $[(Q_2K_2^T/\sqrt{d_{k2}})]$ represents a second normalized index softmax function; $Q_2$ represents a feature vector of the current video in a second Query layer; $K_2$ represents the feature vector of the current video in the Key layer; $V_2$ represents the feature vector of the current video in a second Value layer; $W_i^{Q2}$ represents a weight matrix of the second Query layer; $W_i^{K2}$ represents a weight matrix of the second Key layer; represents a weight matrix of the second Value layer; $x_2$ represents the identifier information of the current video; $p_2$ represents the position information of the current video; the position information of the current video comprises position information of the current video on a display page and/or a display page where the current video is located; and $d_{k2}$ represents a second input dimension.

Optionally, the processor 502 also has the following functions: obtaining the fourth interest preference parameter according to a fifth formula, wherein the fifth formula is head'$_i$=Attention $(Q_2W_i^{Q2}, K_2W_i^{K2}, V_2W_i^{V2})$, head'$_i$ represents the fourth interest preference parameter; and obtaining the interest preference vector of the current video according to a sixth formula, wherein the sixth formula is MultiHead $(Q_2, K_2, V_2)$=Concat (head'$_1$, head'$_2$, ... head'$_i$)$W^{O2}$; MultiHead $(Q_2, K_2, V_2)$ represents the interest preference vector of the current video; Concat (head'$_1$, head'$_2$, ... head'$_i$) represents a second concatenate function; and $W^{O2}$ represents a weight matrix of a second MultiHead layer.

Optionally, the processor 502 also has the following functions: inputting the interest preference vector of the current video to a second feed forward neural network to obtain the preference vector of the current video, wherein the second feed forward neural network is FFN $(y_2)$=ReLU$_2$ $(y_2H_{21}+b_{21})$ $H_{22}+b_{22}$; $y_2$=MultiHead $(Q_2, K_2, V_2)$; $y_2$ represents the interest preference vector of the current video; ReLU$_2(y_2H^{21}+b^{21})$ $H_{22}$ represents an activation function of a first layer in the second feed forward neural network; ReLU$_2(y_2H_{21}+b_{21})$ $H_{22}+b_{22}$ represents a linear activation function of a second layer in the first feed forward neural network; $H_{21}$ represents a weight matrix of the first layer in the second feed forward neural network; $H_{22}$ represents a weight matrix of the second layer in the second feed forward neural network; $b_{21}$ represents a bias term of the first layer in the second feed forward neural network; and $b_{22}$ represents a bias term of the second layer in the second feed forward neural network.

Optionally, the processor 502 also has the following functions: inputting a preference vector corresponding to a first current video to each of N expert networks, wherein a proportion of the preference vector corresponding to the first current video in each expert network is different, a being-selected weight corresponding to each expert network is different, and N is a positive integer greater than or equal to 1; outputting a target preference vector corresponding to the first current video according to the proportion of the preference vector corresponding to the first current video in each expert network and the being-selected weight corresponding to each expert network; obtaining N target preference vectors corresponding to N current videos; and determining N target videos according to the N target preference vectors.

Optionally, the processor 502 also has the following functions: performing weighted summation on the proportion of the preference vector corresponding to the first current video in each expert network and the being-selected weight corresponding to each expert network, and outputting a target preference vector corresponding to the first current video.

Optionally, the processor 502 also has the following functions: performing weighted summation on the proportion of the preference vector corresponding to the first current video in each expert network and the being-selected weight corresponding to each expert network, and outputting a preference vector parameter corresponding to the first current video; and outputting, in a case that a value of the preference vector parameter is greater than a preset parameter threshold, the target preference vector corresponding to the first current video.

All or some of the foregoing embodiments may be implemented by using software, hardware, firmware, or any combination thereof. When software is used to implement the embodiments, all or a part of the embodiments may be implemented in a form of a computer program product.

The computer program product includes one or more computer instructions. When the computer program instructions are loaded and executed on the computer, the procedure or functions according to the embodiments of the present disclosure are all or partially generated. The computer may be a general-purpose computer, a special-purpose computer, a computer network, or other programmable apparatuses. The computer instructions may be stored in a computer-readable storage medium or may be transmitted from one computer-readable storage medium to another computer-readable storage medium. For example, the computer instructions may be transmitted from a website, a computer, a server, or a data center to another website, computer, server, or data center in a wired manner (for example, by using a coaxial cable, an optical fiber, or a digital subscriber line (DSL)) or a wireless (for example, infrared, radio, or microwave) manner. The computer-readable storage medium may be any usable medium that can be stored by the computer, or a data storage device, for example, a server or a data center, integrating one or more usable media. The usable medium may be a magnetic medium (for example, a floppy disk, a hard disk, or a magnetic tape), an optical medium (for example, DVD), a semiconductor medium (for example, Solid State Disk (SSD)), or the like.

A person skilled in the art can clearly understand that for convenience and conciseness of description, for specific working processes of the foregoing systems, devices, and units, refer to the corresponding processes in the foregoing method embodiments, and details are not described here again.

In the several embodiments provided in the present disclosure, it should be understood that the disclosed system, apparatuses, and methods may be implemented in other manners. For example, the above-described apparatus embodiments are merely illustrative. For example, the division of the units is only one type of logical functional division, and other divisions is achieved in practice. For example, multiple units or components can be combined or integrated into another system, or some features can be omitted, or not executed. In addition, the displayed or discussed mutual couplings or direct couplings or communication connections may be implemented through some interfaces. The indirect couplings or communication connections between the apparatuses or units may be implemented in electronic, mechanical or other forms.

The units described as separate parts may or may not be physically separate, and parts displayed as units may or may not be physical units, may be located in one position, or may be distributed on a plurality of network units. Some or all of the units are selected according to actual needs to achieve the objective of the solution of this embodiment.

In addition, functional units in embodiments of the present disclosure may be integrated into one processing unit, or each of the units may exist alone physically, or two or more units are integrated into one unit. The integrated unit may be implemented in a form of hardware, or may be implemented in a form of a software function unit.

When the foregoing integrated unit is implemented in the form of a software functional unit and sold or used as an independent product, the integrated unit may be stored in a computer-readable storage medium. Based on such an understanding, the technical solutions of the present disclosure essentially, or the part contributing to the prior art, or all or some of the technical solutions may be presented in the form of a software product. The computer software product is stored in a storage medium, and includes several instructions for instructing a computer device (which may be a personal computer, a server, a network device, or the like) to perform all or some of the steps of the methods of the various embodiments of the present disclosure. The aforementioned storage media include: various media that can store program codes, such as a USB flash drive, a mobile hard disk drive, a Read-Only Memory (ROM), a Random Access Memory (RAM), a magnetic disk, and an optical disc.

The above various embodiments are only used to describe the technical solutions of the present disclosure, and not intended to limit the present disclosure. Although the present disclosure has been described in detail with reference to the foregoing embodiments, those ordinarily skilled in the art should understand that they can still modify the technical solutions described in all the foregoing embodiments, or equivalently replace some or all of the technical features, and these modifications or replacements do not depart the essences of the corresponding technical solutions from the spirit and scope of the technical solutions of all the embodiments of the present disclosure.

What is claimed is:

1. A video recommendation method, comprising:
   acquiring identifier information of a watched video, position information of the watched video, identifier information of a current video, and position information of the current video;
   inputting the identifier information of the watched video and the position information of the watched video to a first model to obtain a preference vector of the watched video;
   inputting the preference vector of the watched video, the identifier information of the current video, and the position information of the current video to a second model to obtain a preference vector of the current video; and
   determining a target video according to the preference vector of the current video, wherein
   the determining a target video according to the preference vector of the current video comprises:
   inputting a preference vector corresponding to a first current video to each of N expert networks, wherein a proportion of the preference vector corresponding to the first current video in each expert network is different, a being-selected weight corresponding to each expert network is different, and N is a positive integer greater than or equal to 1;
   outputting a target preference vector corresponding to the first current video according to the proportion of the preference vector corresponding to the first current video in each expert network and the being-selected weight corresponding to each expert network;
   obtaining N target preference vectors corresponding to N current videos; and
   determining N target videos according to the N target preference vectors.

2. The method according to claim 1, wherein the inputting the identifier information of the watched video and the position information of the watched video to a first model to obtain a preference vector of the watched video comprises:
   inputting the identifier information of the watched video and the position information of the watched video to a first target model to obtain an interest preference vector of the watched video; and
   inputting the interest preference vector of the watched video to a second target model to obtain a preference vector of the watched vector; and
   the first model comprises the first target model and the second target model.

3. The method according to claim 2, wherein the inputting the identifier information of the watched video and the position information of the watched video to a first target model to obtain an interest preference vector of the watched video comprises:
   obtaining a first interest preference parameter according to the identifier information of the watched video and the position information of the watched video;
   obtaining a second interest preference parameter according to the first interest preference parameter; and
   obtaining the interest preference vector of the watched video according to the second interest preference parameter.

4. The method according to claim 3, wherein the obtaining a first interest preference parameter according to the identifier information of the watched video and the position information of the watched video comprises:
   obtaining the first interest preference parameter according to a first formula, wherein the first formula is Attention $(Q_1, K_1, V_1)$=softmax $[(Q_1 K_1 T/\sqrt{d_{k1}})]V_1$; $Q_1 = W_i^{Q1}(x_1+p_1)$; $K_1 = W_i^{K1}(x_1+p_1)$; $V_1 = W_i^{V1}(x_1+p_1)$;
   Attention $(Q_1, K_1, V_1)$ represents the first interest preference parameter;
   softmax $[(Q_1 K_1 T/\sqrt{d_{k1}})]$ represents a first normalized index softmax function;
   $Q_1$ represents a feature vector of the watched video in a first Query layer; $K_1$ represents a feature vector of the watched video in a first Key layer; $V_1$ represents a feature vector of the watched video in a first Value layer; $W_i^{Q1}$ represents a weight matrix of the first Query layer; $W_i^{K1}$ represents a weight matrix of the first Key layer; $W_i^{V1}$ represents a weight matrix of the first Value layer; $x_1$ represents the identifier information of the watched video; $p_1$ represents the position information of the watched video; the position information of the watched video comprises position information of the watched video on a display page, or a display page where the watched video is located, or both of position information of the watched video on a display page and a display page where the watched video is located; and $d_{k1}$ represents a first input dimension.

5. The method according to claim 3, wherein the obtaining a second interest preference parameter according to the first interest preference parameter, and obtaining the interest preference vector of the watched video according to the second interest preference parameter comprises:
obtaining the second interest preference parameter according to a second formula;
wherein the second formula is $head_i$=Attention $(Q_1 W_i^{Q1}, K_1 W_i^{K1}, V_1 W_i^{V1})$; $head_i$ represents the second interest preference parameter; and
obtaining the interest preference vector of the watched video according to a third formula;
wherein the third formula is MultiHead $(Q_1, K_1, V_1)$=Concat $(head_1, head_2, \ldots head_i)W^{O1}$; MultiHead $(Q_1, K_1, V_1)$ represents the interest preference vector of the watched video; Concat $(head_1, head_2, \ldots head_i)$ represents a first concatenate function; and $W^{O1}$ represents a weight matrix of a first MultiHead layer.

6. The method according to claim 2, wherein the inputting the interest preference vector of the watched video to a second target model to obtain a preference vector of the watched vector comprises:
inputting the interest preference vector of the watched video to a first feed forward neural network to obtain the preference vector of the watched video;
wherein the first feed forward neural network is FFN $(y_1)$=$ReLU_1(y_1 H_{11}+b_{11}) H_{12}+b_{12}$; $y_1$=MultiHead $(Q_1, K_1, V_1)$;
$y_1$ represents the interest preference vector of the watched video;
$ReLU_1(y_1 H_{11}+b_{11}) H_{12}$ represents an activation function of a first layer in the first feed forward neural network; $ReLU_1(y_1 H_{11}+b_{11}) H_{12}+b_{12}$ represents a linear activation function of a second layer in the first feed forward neural network;
$H_{11}$ represents a weight matrix of the first layer in the first feed forward neural network; $H_{12}$ represents a weight matrix of the second layer in the first feed forward neural network;
$b_{11}$ represents a bias term of the first layer in the first feed forward neural network; and $b_{12}$ represents a bias term of the second layer in the first feed forward neural network.

7. The method according to claim 1, wherein the inputting the preference vector of the watched video, the identifier information of the current video, and the position information of the current video to a second model to obtain a preference vector of the current video comprises:
obtaining a third interest preference parameter according to the preference vector of the watched video, the identifier information of the current video, and the position information of the current video;
obtaining a fourth interest preference parameter according to the third interest preference parameter;
obtaining an interest preference vector of the current video according to the fourth interest preference parameter; and
inputting the interest preference vector of the current video to a third target model to obtain the preference vector of the current video, wherein the second model comprises the third target model.

8. The method according to claim 7, wherein the preference vector of the watched video comprises a feature vector of the current video in a second Key layer and a feature vector of the current video in a second Value layer; the obtaining a third interest preference parameter according to the preference vector of the watched video, the identifier information of the current video, and the position information of the current video comprises:
obtaining the third interest preference parameter according to a fourth formula;
wherein the fourth formula is Attention $(Q_2, K_2, V_2)$=softmax $[(Q_2 K_2^T/\sqrt{d_{k2}})]V_2$; $Q_2$=$W_i^{Q2} (x_2+p_2)$;
Attention $(Q_2, K_2, V_2)$ represents the third interest preference parameter;
softmax $[(Q_2 K_2^T/\sqrt{d_{k2}})]$ represents a second normalized index softmax function;
$Q_2$ represents a feature vector of the current video in a second Query layer; $K_2$ represents the feature vector of the current video in the Key layer; $V_2$ represents the feature vector of the current video in a second Value layer; $W_i^{Q2}$ represents a weight matrix of the second Query layer; $W_i^{K2}$ represents a weight matrix of the second Key layer; $W_i^{V2}$ represents a weight matrix of the second Value layer; $x_2$ represents the identifier information of the current video; $p_2$ represents the position information of the current video; the position information of the current video comprises position information of the current video on a display page, or a display page where the current video is located, or both of position information of the current video on a display page and a display page where the current video is located; and $d_{k2}$ represents a second input dimension.

9. The method according to claim 7, wherein the obtaining a fourth interest preference parameter according to the third interest preference parameter, and obtaining an interest preference vector of the current video according to the fourth interest preference parameter comprises:
obtaining the fourth interest preference parameter according to a fifth formula;
wherein the fifth formula is $head'_i$=Attention $(Q_2 W_i^{Q2}, K_2 W_i^{K2}, V_2 W_i^{V2})$; $head'_i$ represents the fourth interest preference parameter; and
obtaining the interest preference vector of the current video according to a sixth formula;
wherein the sixth formula is MultiHead $(Q_2, K_2, V_2)$=Concat $(head'_1, head'_2, \ldots, head'_i)W^{O2}$; MultiHead $(Q_2, K_2, V_2)$ represents the interest preference vector of the current video; Concat $(head'_1, head'_2, \ldots head'_i)$ represents a second concatenate function; and $W^{O2}$ represents a weight matrix of a second MultiHead layer.

10. The method according to claim 7, wherein the inputting the interest preference vector of the current video to a third target model to obtain a preference vector of the current vector comprises:
inputting the interest preference vector of the current video to a second feed forward neural network to obtain the preference vector of the current video;
wherein the second feed forward neural network is FFN $(y_2)$=$ReLU_2(y_2 H_{21}+b_{21}) H_{22}+b_{22}$; $y_2$=MultiHead $(Q_2, K_2, V_2)$;
$y_2$ represents the interest preference vector of the current video;
$ReLU_2(y_2 H_{21}+b_{21}) H_{22}$ represents an activation function of a first layer in the second feed forward neural network; $ReLU_2(y_2 H_{21}+b_{21}) H_{22}+b_{22}$ represents a linear activation function of a second layer in the first feed forward neural network;
$H_{21}$ represents a weight matrix of the first layer in the second feed forward neural network;

$H_{22}$ represents a weight matrix of the second layer in the second feed forward neural network;

$b_{21}$ represents a bias term of the first layer in the second feed forward neural network; and $b_{22}$ represents a bias term of the second layer in the second feed forward neural network.

11. The method according to claim 10, wherein the outputting a target preference vector corresponding to the first current video according to the proportion of the preference vector corresponding to the first current video in each expert network and the being-selected weight corresponding to each expert network comprises:

performing weighted summation on the proportion of the preference vector corresponding to the first current video in each expert network and the being-selected weight corresponding to each expert network, and outputting a target preference vector corresponding to the first current video.

12. The method according to claim 11, wherein the performing weighted summation on the proportion of the preference vector corresponding to the first current video in each expert network and the being-selected weight corresponding to each expert network, and outputting a target preference vector corresponding to the first current video comprises:

performing weighted summation on the proportion of the preference vector corresponding to the first current video in each expert network and the being-selected weight corresponding to each expert network, and outputting a preference vector parameter corresponding to the first current video; and when a value of the preference vector parameter is greater than a preset parameter threshold, outputting the target preference vector corresponding to the first current video.

13. A terminal device, comprising:

a memory, storing executable program codes; and a processor, coupled to the memory, wherein the processor calls the executable program codes stored in the memory, and the executable program codes, when executed by the processor, cause the processor to implement the method according to claim 1.

14. A non-transitory computer-readable storage medium, configured to store executable program codes, wherein the executable program codes, when executed by a processor, implement the method according to claim 1.

* * * * *